US009761125B2

(12) United States Patent
Mattos Vega

(10) Patent No.: US 9,761,125 B2
(45) Date of Patent: Sep. 12, 2017

(54) RECEIVING UNIT FOR A SURVEILLANCE ARRANGEMENT

(71) Applicant: Richard Eusebio Mattos Vega, Buenos Aires (AR)

(72) Inventor: Richard Eusebio Mattos Vega, Buenos Aires (AR)

( * ) Notice: Subject to any disclaimer, the term of this patent is extended or adjusted under 35 U.S.C. 154(b) by 6 days.

(21) Appl. No.: 14/534,166

(22) Filed: Nov. 6, 2014

(65) Prior Publication Data

US 2015/0137966 A1 May 21, 2015

(30) Foreign Application Priority Data

Nov. 14, 2013 (AR) ................................ P130104187

(51) Int. Cl.

*G08B 23/00* (2006.01)
*G08B 29/18* (2006.01)
*G08B 25/00* (2006.01)
*G08B 25/14* (2006.01)
*G08B 1/08* (2006.01)
*H04M 11/04* (2006.01)

(52) U.S. Cl.

CPC ........... *G08B 29/18* (2013.01); *G08B 25/009* (2013.01); *G08B 25/14* (2013.01)

(58) Field of Classification Search

CPC .... G08B 25/008; G08B 25/001; G08B 25/10; G08B 25/14
USPC ........................................................ 340/501
See application file for complete search history.

(56) References Cited

U.S. PATENT DOCUMENTS

| | | | | |
|---|---|---|---|---|
| 4,368,349 | A * | 1/1983 | Donley | H05K 7/026 174/535 |
| 2004/0189460 | A1* | 9/2004 | Heaton | G08B 25/10 340/500 |
| 2007/0199076 | A1* | 8/2007 | Rensin | H04L 29/06027 726/27 |
| 2010/0245107 | A1* | 9/2010 | Fulker | G06F 17/30873 340/691.6 |
| 2013/0040600 | A1* | 2/2013 | Reitnour | G01S 19/17 455/404.2 |
| 2014/0062693 | A1* | 3/2014 | Watts | G08B 27/006 340/539.11 |

* cited by examiner

*Primary Examiner* — Jack K Wang
(74) *Attorney, Agent, or Firm* — Defillo & Associates, Inc.; Evelyn A Defillo

(57) ABSTRACT

Receiving unit for a surveillance arrangement, comprising a container which contains a radiofrequency receiver, a processor, a non-volatile memory, a relay, a removable SD memory, a network module and an audio module. Ability to manage an unlimited quantity of identifiable remote controls.

6 Claims, 4 Drawing Sheets

RECEIVING UNIT FOR A SURVEILLANCE ARRANGEMENT

FIELD OF THE INVENTION

The instant invention relates to a receiving unit for a surveillance arrangement.

BACKGROUND OF THE INVENTION

Prior Art

As a consequence of the increase of criminal actions, surveillance systems are widely used for controlling determined zones. This is the case of enclosed neighborhoods or country clubs. Also, public buildings have surveillance and safety personnel. This has been extended to apartment buildings.

Personnel devoted to this task come from safety organizations and agencies created to this end.

Also, there are places controlled remotely using different technological resources, such as fixed or mobile cameras, movement sensors, microphones, different recording means, etc.

It is clear that all applications used imply a data accumulation to be identified, checked, administered and directed to give a response to the call or signal emitted from a determined event.

Information captured by different means is sent to a remote place where signals from different locations being surveyed are checked. In this remote place the material received is studied and, if necessary, the proper response is established.

Alarm buttons are also known. These are push buttons activating an alarm or signal allowing intervention of specialized personnel.

Known systems have some disadvantages overcome by the instant invention.

For example, alarm buttons of prior art operate 1 to 1, i.e., each bottom uses a link independent from the others, this requiring complex equipment which is avoided by the use of the invention.

Besides, generally, all radiofrequency receiving equipment have a limit of 99 positions; therefore, if clients to be surveyed are more than a hundred, multiple receptors are required, which in turn need to be different from each other, which results in a greater complexity for administering data received from the different points.

The instant invention may administer an unlimited number of codes and identify which is the activated control; therefore there is no limit in the amount of controls for a determined location.

SUMMARY OF THE INVENTION

Basically, the instant invention relates to a receiving unit for a surveillance arrangement comprising a container including a radiofrequency receiver, a processor, a nonvolatile memory, a relay, a removable SD memory, a network module and an audio module.

The receiver is engaged to a network connection and, by means of this network, to a database having access from any virtual point or from a control center.

A preferred embodiment of the invention will be now described in connection with the accompanying drawings. Components of the invention may be selected among various equivalents without departing from the scope.

REFERENCES

Figure 1:
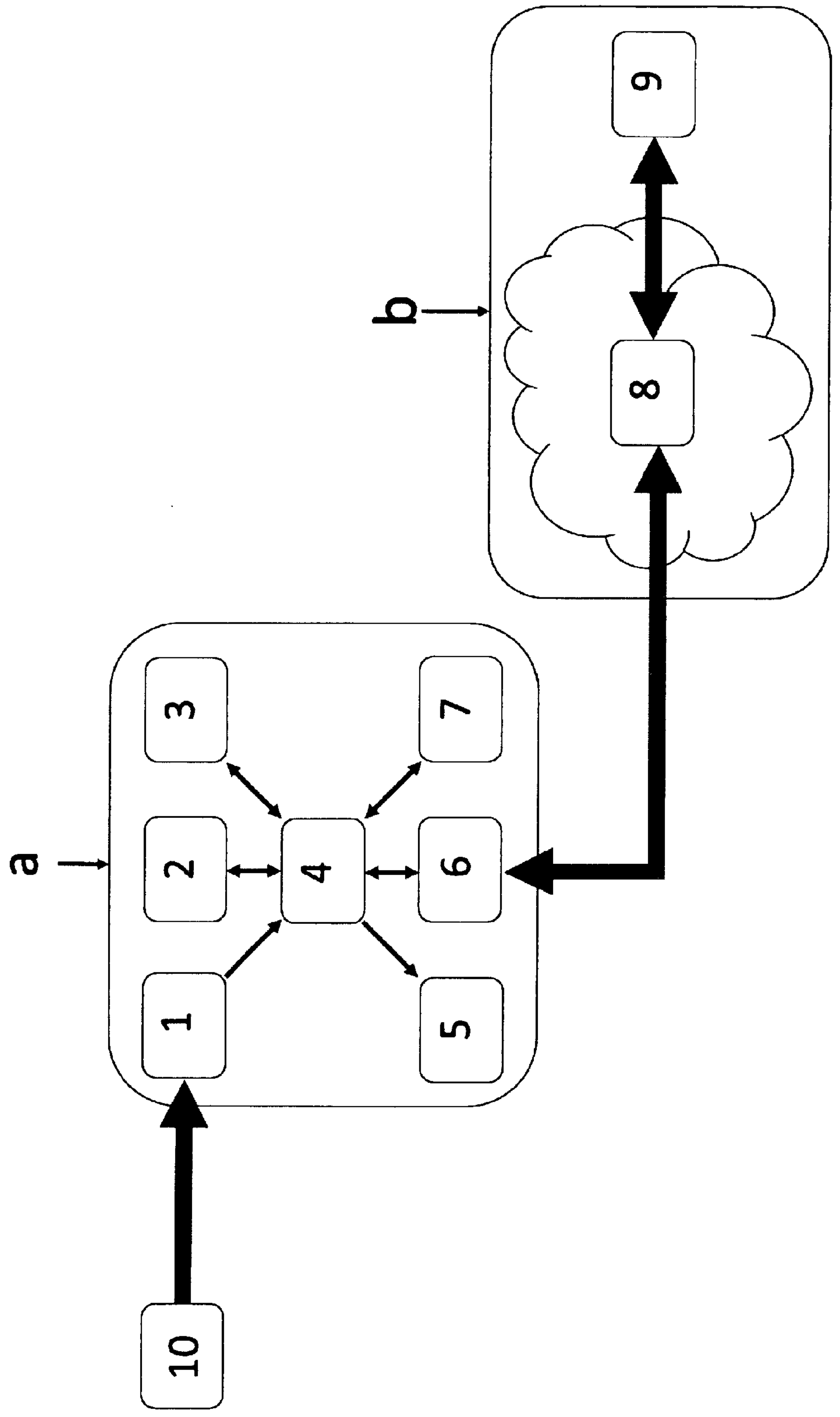
FIG. 1 is a block diagram including the different components of the invention.
Figure 2:
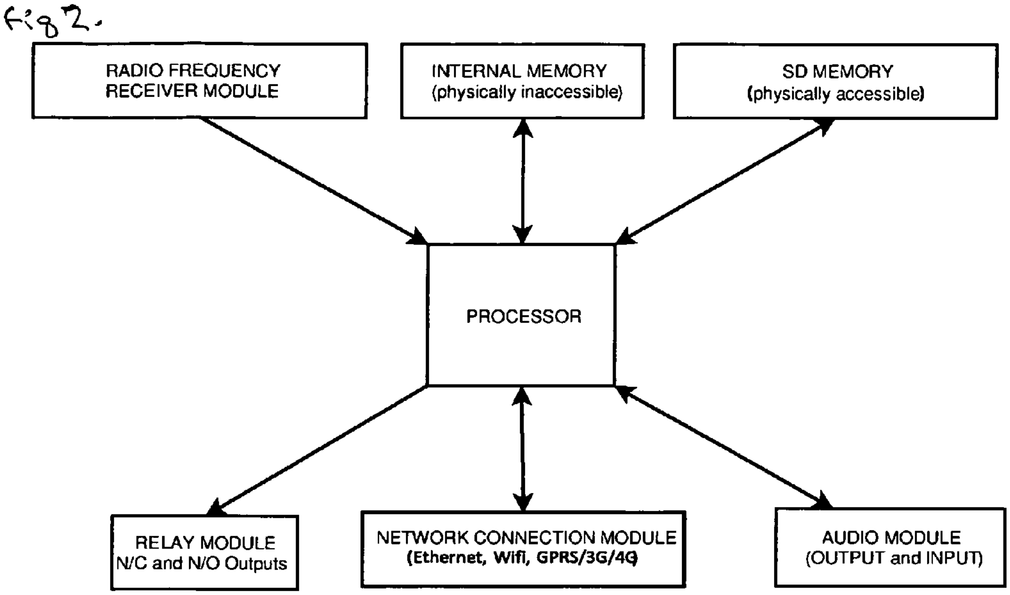

- -a- Receiving unit of the invention
- -1- Radiofrequency receiver
- -2- Memory
- -3- Removable SD memory
- -4- Processor
- -5- Relay
- -6- Network module
- -7- Audio module
- -b- Complimentary network software
- -8- Database
- -9- Interphone
- -10- Remote control or radiofrequency emitter FIG. 2 is a block diagram showing names and relationship of the parts constituting the receiving unit of the invention.

Figure 3:
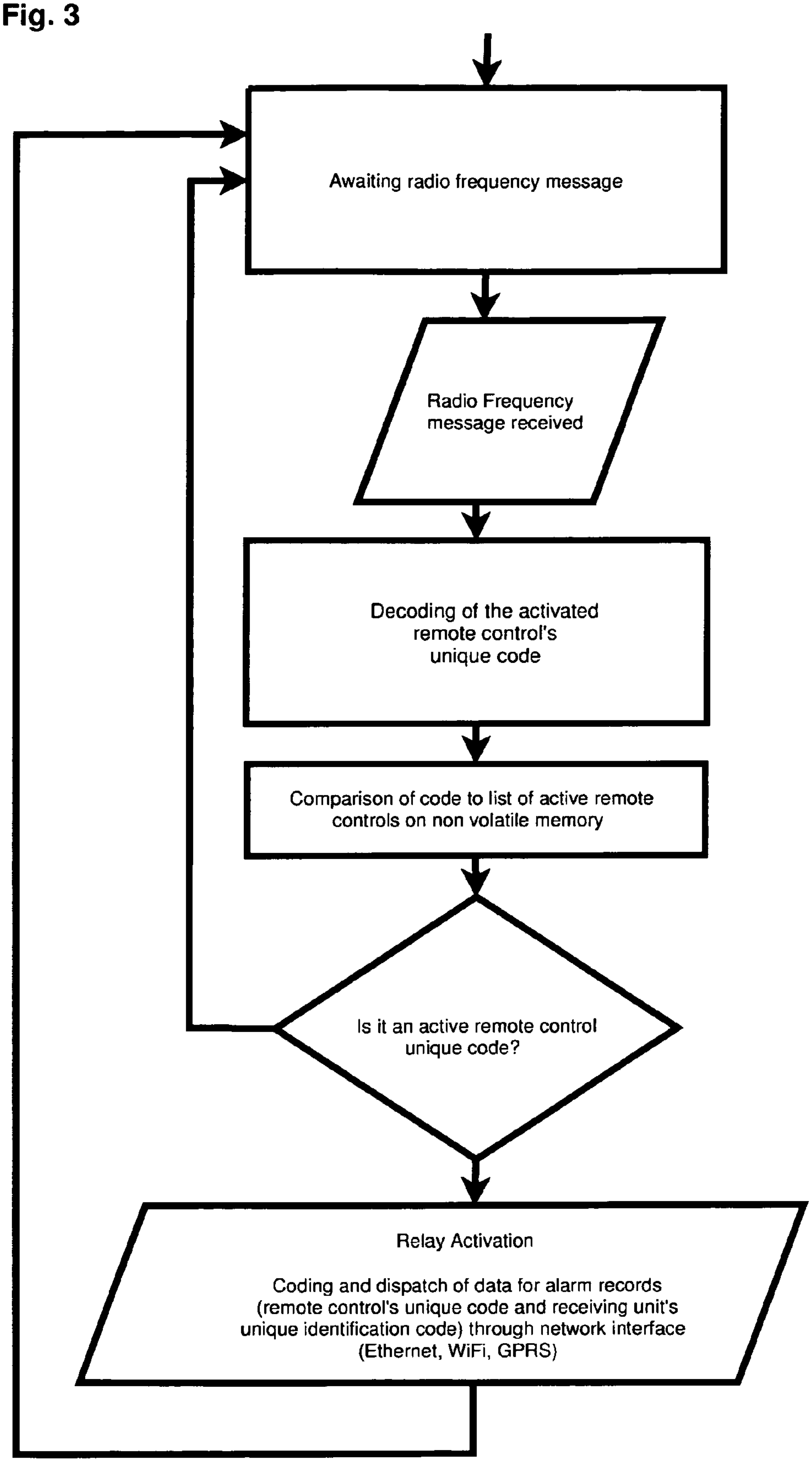

FIG. 3 is a flow diagram showing the invention's normal operation process.

Figure 4:
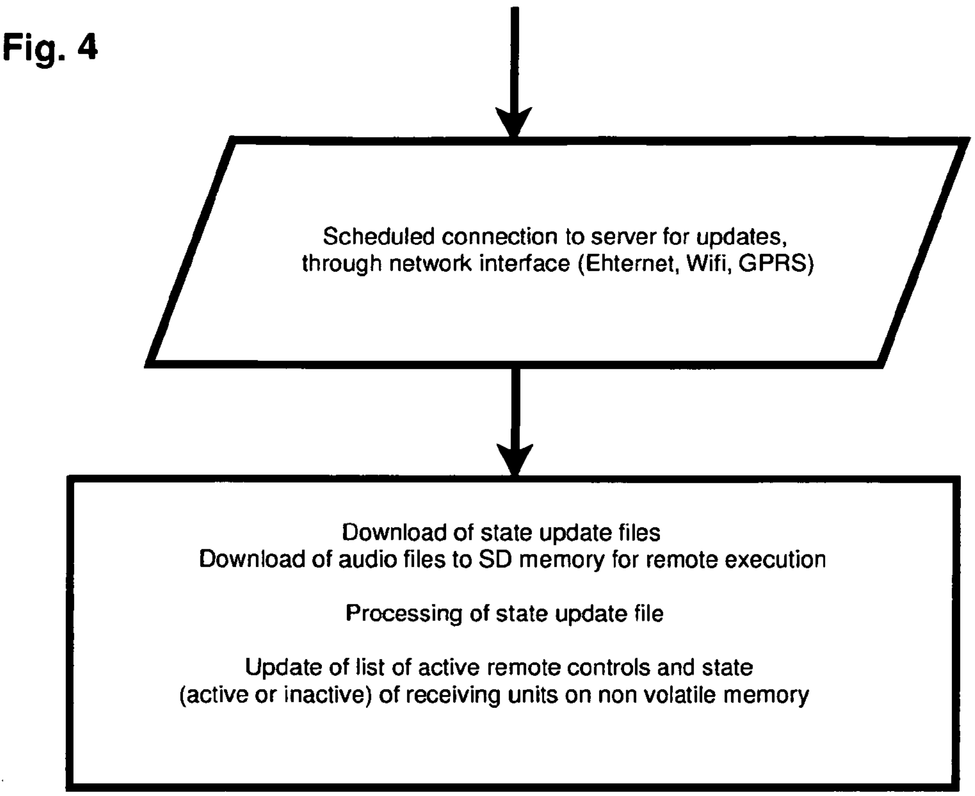

FIG. 4 is a flow diagram showing the process by which the invention downloads and processes the status update file.

DETAILED DESCRIPTION OF THE INVENTION

The receiving unit for a surveillance arrangement disclosed herein is highly suitable for identifying a signal among all possible signals received from a determined location.

In fact, by the use of the invention, it is possible to identify that the signal has been triggered, for example, by a person in an apartment of a building. Such identification may provide additional information decisive in some cases, since such information may be comprised by codes, photographs and names and telephones of the persons associated to the alarm emitter. If the person involved has any health problem or any other problem preventing himself/herself any action, information includes associates codes and names and telephone numbers or persons or institutions to be contacted.

In what concerns to a neighborhood, it is possible to use, apart from the personal device for emitting the alarm signal, a radiofrequency emitter (with the same operating principle of remote controls) which is activated when a normal open contact is closed or when receiving information engaging it to the alarm of each of the houses in that neighborhood.

In case of using a single receiving unit, if one of the alarms is activated, the event will be reflected immediately at the monitoring interphase which, among other data, will show a location map of the house, photographs, names and telephone numbers of associated persons.

The advantage, as compared with present monitored alarms using a cell network connection per each house is that, apart from adding monitoring of persons by means of remote controls, the arrangement of the invention only needs one network connection per neighborhood, regardless the amount of houses to be monitored, which drastically reduces network connection costs and complexity of installations as well as maintenance costs. In case distances so require, known radiofrequency repeaters should be installed.

The receiving unit for a surveillance arrangement of the invention -a- includes a radiofrequency receiver -1- for detecting an electromagnetic wave of a determined frequency emitted by a remote control -10- activated by the user under a determined condition.

The signal is sent to a processor -4-, is decoded, and then may have access to a non-volatile memory -2- to verify whether the code received is an active code, i.e. authorized by the service supplier, also verifying whether the receiving unit -a- is active, thus completing the process.

The code list in said non-volatile memory -2- is updated periodically according to changes made by the service supplier, such as inclusion of new users or discharge of users due to suspension of services, lack of payment, etc.

Once the code validity and operation of the receiving unit -a- are checked, processor -4- activates an outlet connected to a relay -5- operating as a connection to any existing system, opening a normal closed contact or closing a normal open contact thus triggering the signal in the corresponding system.

Simultaneously, processor -4- codes and records the event in the database -8-, along with the remote control unique number -10- and the unique number of receiving unit -a- by means of the network module -6- which may be wired, wireless or GPRS/EG/4G to record the event.

In locations where there is no network connection or GPRS, or where the network has defects or lack of connection, the receiving unit -a- may send information of the event through text messages (SMS). In these cases, data of remote control -10- users may be loaded in the non-volatile memory -2- to send complete information of the event in the text message directed to the administrator of such location.

This configuration may be also effected upon request from the user, for example, if the user has no network connection at all.

Interphase -9- , having access to the database -8-, allows operating in real time thus assuring that the events will be seen by the person in charge of the control of the location from which the event comes from, as well as of the receiving unit -a- and remote controls -10-, thus allowing amendments as well as suspensions and admissions.

Each receiving unit -a- allows by means of audio module -7- and network module -6-, a two way audio communication started remotely from interphase -9- as well as reproduction of a pre-recorded audio message which may be sent and updated at the time of unloading updating of unique codes of remote controls (10) as well as updating of the state of receiving units -a-.

In case a register is to be created, all events may be saved in a removable SD memory -3-.

In order to avoid copy of the elements as well as preventing hacking, once the mentioned components are introduced in the receiving unit -a-, the radiofrequency receiver -1-, processor -4-, memory -2-, the network module -6-, relay -6-, audio module -7- and removable SD memory -3-, a resinous substance is injected sealing the arrangement. When this substance is dry, it is practically impossible to have access to the components.

Database -8- contains information related to remote controls -10- distributed among the service users, such as the steps to follow in case of alarm, these guidelines being previously agreed upon by the user and the service supplier.

Information stored in database -8- also includes allocation of identification codes to each of remote controls -10- and identification codes of remote controls of associated clients, location of the place where the service is rendered, including an interactive map of the zone, and data of persons to whom each code is related. Said database -8- may be housed in a web server to which access is possible by means of interphase -9-

The supplier as well as the user may have access to removable SD memory -3-; from there being able to set the connection interval to unload the updated status and the list of unique codes of remote controls -10- as well as the period of time during which the pushbutton should be pressed in order that the event be effective, thus avoiding accidents due to mishandling, which could result in false positive events.

Audio messages previously saved in removable SD memory may be executed or not, as well as the minimum waiting time between unique codes of remote controls -10- thus avoiding multiple records for the same event.

Configuration data may be also entered to have access to the network by active module Ethernet, Wifi or GPRS/3G/4G. Also, telephone numbers may be included to send the event via SMS in case network fails. Thus active network module GPRS/EG/4G and telephone numbers are used to send the event via SMS in case this operating mode is selected. In this case, the active module should also be GPRS/3G/4G.

Remote controls -10- based on present technology have a universe of combinations from 2 to 20 which results in 1048576 possible unique codes.

The radiofrequency receiver -1- in not limited in what concerns to its ability to receive codes with a length of more than 20 bits, therefore, it is compatible with remote controls that may carry out said emissions in the future.

Further, the universe of possible combinations to generate unique codes of each receiving unit -a- is only limited by the size to be given to the information alphanumerical scope used to send said code to the database -8-, thus, with a scope of only 5 digits, possible combinations are over 900 million.

In practice, there are no limitations in what concerns to the amount of surveyed locations or the amount of remote controls -10- which may be individualized per each location.

In an alternative embodiment which may be used separately or as a complement to remote control -10- a radiofrequency emitter is used which is activated when a normal open contact is closed or when receiving a supply.

Said radiofrequency emitter is connected to the alarm of a house and to a receiving unit -a-. If one of the alarms is activated, the event will be immediately reflected in interphase -9- which, among other data, will display a map showing the house location, photographs, names and telephone numbers of associated persons, etc.

The advantage over present monitored alarms, using a connection to the cell network connection per each house or flat is that, on one side, simultaneously, it may add individual monitoring of people and on the other only requires a network connection per neighborhood, regardless the amount of houses to be monitored.

This drastically reduces costs of network connection as well as complexity of installations and maintenance. It is obvious that in case distances are an issue, it will be necessary to install repeaters.

It should be understood that the particular embodiments shown and discussed herein are not the only ways in which the invention can exist. They are currently preferred embodiments of the invention. One skilled in the art can readily see other variations that would also fall within the scope of the appended claims.

The invention claimed is:

1. A receiving unit for an alarm surveillance system comprising:

a) a plurality of remote control devices, each remote control device generates a unique code signal when manually activated by a user;

b) a receiving unit having a sealed housing including inside the following components:
at least one radiofrequency receiver which captures the unique code signal emitted from one of the remote controls;
a processor connected to the at least one radiofrequency receiver, the processor decodes the unique code signal;
a non-volatile memory connected to the processor, the non-volatile memory stores a list of active users and registers events by using codification of a remote code and the unique code signals;
a relay connected to the processor, the processor activates an outlet connected to the relay when the non-volatile memory verifies the unique code signal;
an audio module connected to the processor;
a network module connected to the processor, the audio and network modules create a two-way real time communication;
a resinous substance pouring over the components inside the sealed housing, the resinous substance sealing the components inside the housing, preventing access to the components;
c) a database housed on a web server connected to the at least one radiofrequency receiver by a network connection, the network connection is accessed from a control center, the processor codes and records an event in the database by using the network module, the database containing a SD memory with information related to the unique code signal of each one of the remote control devices, guides to be followed in case the event is produced, location of the place where the service is rendered, data of the user of the remote control devices; updated status of the receiving unit, time when the remote control is pressed before triggering an alarm, pre-recorded audio messages; and
d) at least one interphase connected to the database, the at least one interphase displays a map showing the user location, picture of the user, personal information, and phone numbers;
wherein the receiving unit is part of the alarm surveillance system, wherein the receiving unit alone controls all of the unique code signals generated by the plurality of remote controls.

2. The receiving unit according to claim 1, wherein the network connection is selected from the group consisting of a wire connection, a wireless connection, a GPRS/3G/4G connection, via text message, wherein the network connection includes data of the users of the remote control stored in the non-volatile memory.

3. The receiving unit according to claim 1, wherein the audio module allows reproduction of pre-recorded audio messages.

4. The receiving unit according to claim 1, wherein the list of unique code signals in the non-volatile memory is continuously updated.

5. The receiving unit according to claim 1, wherein the information stored in the database includes at least one allocation of identification codes of each one of the remote controls given to the user and related people.

6. The receiving unit according to claim 1, wherein the information stored in the database includes personal and medical data of the user related persons.

* * * * *